June 20, 1961      D. T. YAWS      2,989,205
COASTER
Filed Sept. 11, 1959
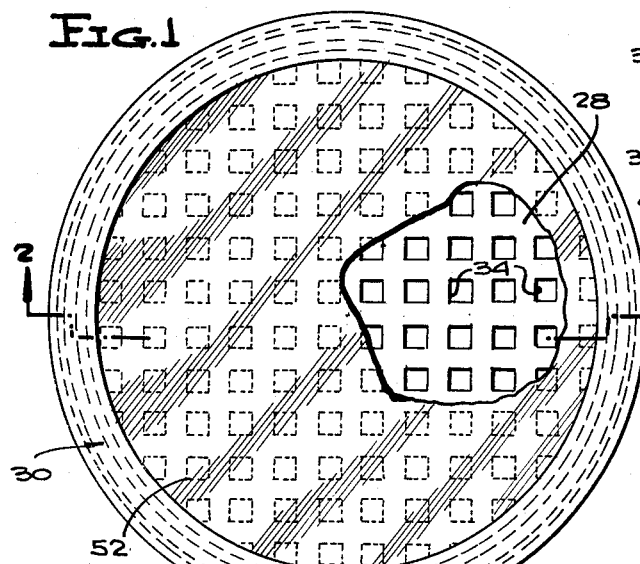
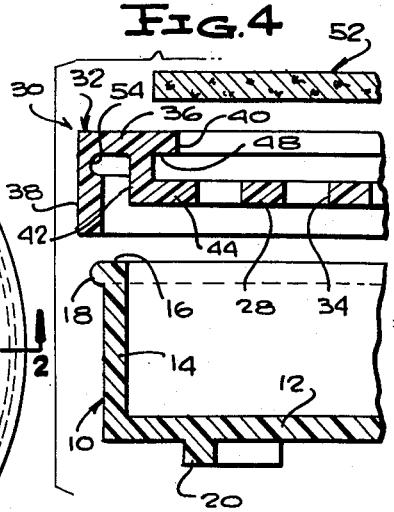
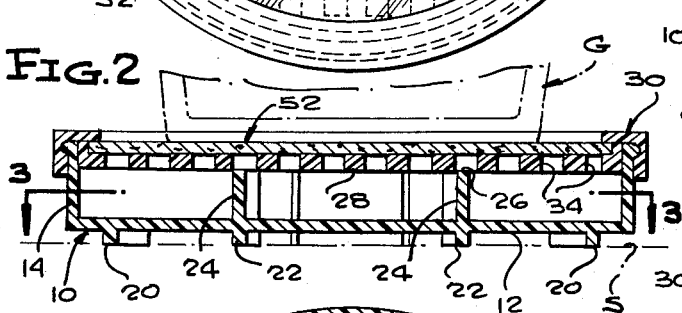
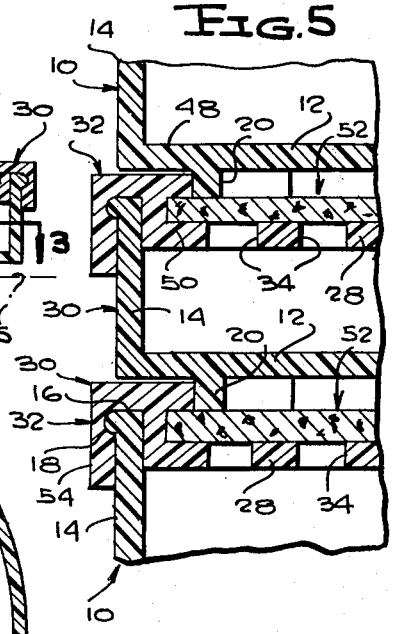
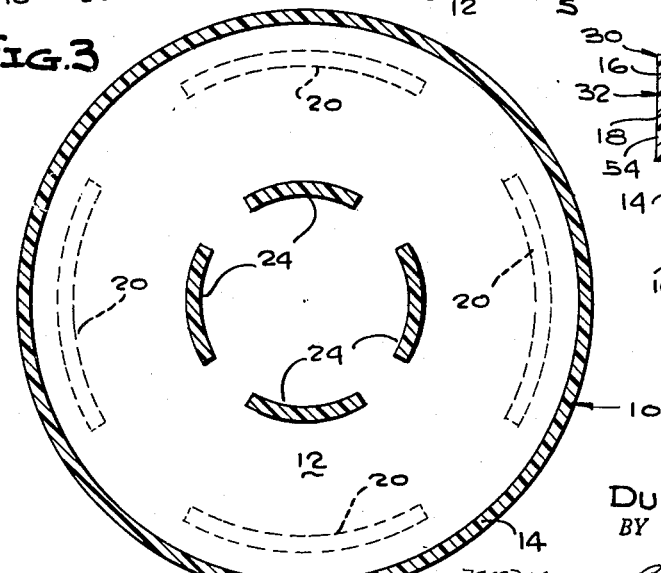
*INVENTOR.*
DUDLEY T. YAWS
BY
McMorrow, Berman & Davidson
*ATTORNEYS*

2,989,205
COASTER
Dudley T. Yaws, 8073 Lenore Drive, Houston 17, Tex.
Filed Sept. 11, 1959, Ser. No. 839,452
2 Claims. (Cl. 215—100.5)

This invention relates to a novel absorbent tray for use primarily, but not exclusively, as a beverage glass coaster.

The primary object of the invention is to provide a more convenient, efficient, and structurally sound device of this kind which affords a protected water accumulating reservoir for condensation moisture draining from iced beverage glasses placed thereon, an absorbent sponge pad supported over and in air and water communication with the reservoir, which serves as a silent and resilient support for glasses and as a vacuum remover for moisture on the bottoms of glasses as glasses are lifted therefrom, and as a controlled means of transferring removed moisture to the reservoir and retaining the moisture therein, the reservoir being large enough to eliminate frequent emptying thereof.

Another object of the invention is to provide a nestable or stockable coaster of the character indicated above which has securably but removably engaged on the upper edge of its container or reservoir, a combined rim and perforated cover or top which serves as a retainer and support for the absorbent pad and which provides for easy removal and replacement of the pad as well as a seat, in conjunction with the pad and a perforated wall upon which the pad lies, for stacking another similar coaster thereon.

A further object of the invention is to provide a coaster of the character indicated above which is relatively uncomplex in construction, is composed of a small number of single and easily assembled parts, and which can be inexpensively made, from a variety of readily available metallic and non-metallic materials, in attractive and varicolored decorative forms, either rectangular or circular, at relatively low cost.

Other important objects and advantageous features of the invention will be apparent from the following description and the accompanying drawings, wherein, for purposes of illustration only, a specific form of the invention is set forth in detail.

In the drawings:

FIGURE 1 is a top plan view, partly broken away, of a coaster of the invention;

FIGURE 2 is a transverse vertical section taken on the line 2—2 of FIGURE 1;

FIGURE 3 is a horizontal section taken on the line 3—3 of FIGURE 2;

FIGURE 4 is an enlarged fragmentary vertical transverse section showing the pad, the rim, and the reservoir container separated; and FIGURE 5 is an enlarged fragmentary vertical transverse section showing assembled coaster in stacked relation.

Referring in detail to the drawings, wherein like numerals designate like parts throughout the several views, the illustrated device, shown as a circular coaster, comprises a pan-shaped water reservoir or container 10 having an imperforate flat bottom wall 12 and an upstanding flat circular imperforate side wall 14 having a plain horizontal and squared upper edge 16 around and flush with which is an external rounded retaining bead or rib 18 which extends continuously around the side wall 14.

Formed on and depending from the bottom wall 12, and located close to the side wall 14 to provide wide and non-tilting bearing upon a supporting surface S, such as a cocktail table, are arcuate, circumferentially spaced outer ribs 20. Positioned inwardly of and concentric with the outer ribs 20 are similar but smaller diameter inner arcuate ribs 22, which are similarly and symmetrically and concentrically spaced from each other. The inner ribs 22 have a function beyond merely supporting the container 10 above a surface S, in that the inner ribs are vertically registered with and in supportive relation to arcuate, circumferentially spaced partition walls 24 which are formed on and rise from the bottom wall 12 to a level at which their flat squared upper edges 26, are on a level spaced downwardly from the upper edge 16 of the container side wall 14.

The arcuate partition walls 24, with their spacing therebetween, act as baffles which prevent sloshing and spilling of water accumulated within the container 10, when the coaster is carried or is inadvertently tilted, and as supports for the central area of the perforated cover plate 28 of a cover or lid and rim assembly 30, which is preferably of integral formation.

The assembly 30 comprises the flat cover plate 28 which merges at its peripheral edge into the rim 32. The plate 28 has evenly distributed thereon drain holes 34 which are relatively small and which are preferably square, as seen in FIGURE 1. The rim 32, as clearly seen in FIGURES 4 and 5, comprises a main circular horizontal top flange 36 which is wider than the thickness of the container side wall 14 and has on its radially outward edge a fixed depending main vertical outer flange 38 to snugly and externally telescope onto the container side wall 14 with the horizontal flange 36 resting upon the upper edge 16 thereof.

At a point spaced between the main vertical flange 38 and the inward edge 40 of the horizontal flange 36, the horizontal flange 36 has a fixed depending auxiliary inner vertical flange 44 which is shorter than the outer flange 38 and has at its lower end a fixed radially inwardly extending annular horizontal flange portion 44 which is part of the cover plate 28. The auxiliary horizontal flange 44, the inner vertical flange 42, and the main horizontal flange 36 define therebetween a radially inwardly facing groove 48.

Removably seated upon the cover plate 28 and having a peripheral edge portion 50 engaged in the groove 48 is a porous compressible and resilient absorbent pad 52, of such as sponge rubber, which can be easily removed for cleaning and replaced, and which in conjunction with the rigid cover plate 28, provides a stable non-tipping support for a beverage glass G placed thereon. The inward edge 40 of the main or top horizontal flange 36, as shown in FIGURE 2, serves as a stop fence to prevent sliding of a glass G off the coaster, and, with the pad 52 and the cover plate 28, serves, as shown in FIGURE 5, as a seat for another similar coaster nested thereupon, wherein the outer container bottom ribs 20 engage within and bear against the edge 40.

The main vertical outer flange 38 is formed with an internal annular groove 54 which is located to snap over the external bead 18 on the container side wall 14 only with sufficient purchase to secure the assembly 30 reasonably securely on the container 10, without impairing easy manual removal of the assembly 30 from the container for emptying accumulated water therefrom and for cleaning purposes.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A coaster comprising a pan-shaped reservoir container having a bottom wall and an upstanding side wall having an upper edge, a cover and rim assembly, said assembly having a perforated cover plate extending across and closing the container and an annular rim removably engaged upon the upper edge of the side wall, and an absorbent and compressible pad resting upon said cover plate, said cover plate being flat and said rim being fixed to the peripheral edge of the cover plate, said rim comprising a main horizontal top flange wider than and bearing upon the upper edge of the container side wall, a main outer vertical depending flange fixed on and depending from the top flange and telescoped upon the container side wall, said top flange having a free radially inward edge, an inner auxiliary vertical flange fixed to and depending from the top flange and engaging the inward side of the container side wall, said cover plate being spaced below said top flange and fixed to the inner vertical flange at a level spaced below the top flange so as to define a radially inwardly opening annular groove on the rim above the cover plate, said pad having a peripheral edge portion removably and retainably engaged in said groove.

2. A coaster comprising a pan-shaped reservoir container having a bottom wall and an upstanding side wall having an upper edge, a cover and rim assembly, said assembly having a perforated cover plate extending across and closing the container and an annular rim removably engaged upon the upper edge of the side wall, and an absorbent and compressible pad resting upon said cover plate, said cover plate being flat and said rim being fixed to the peripheral edge of the cover plate, said rim comprising a main horizontal top flange wider than and bearing upon the upper edge of the container side wall, a main outer vertical depending flange fixed on and depending from the top flange and telescoped upon the container side wall, said top flange having a free radially inward edge, an inner auxiliary vertical flange fixed to and depending from the top flange and engaging the inward side of the container side wall, said cover plate being spaced below said top flange and fixed to the inner vertical flange at a level spaced below the top flange so as to define a radially inwardly opening annular groove on the rim above the cover plate, said pad having a peripheral edge portion removably and retainably engaged in said groove, said outer vertical rim flange having an internal annular retaining groove therein, and said container side wall having an external retaining bead thereon with which the retaining groove is separably engaged.

References Cited in the file of this patent

UNITED STATES PATENTS

| | | |
|---|---|---|
| 1,960,747 | Marks | May 29, 1934 |
| 2,003,895 | Martin | June 4, 1935 |
| 2,145,143 | Trecartin | Jan. 24, 1939 |
| 2,290,144 | Katz | July 14, 1942 |
| 2,681,731 | Chambers | June 22, 1954 |
| 2,695,115 | Roop | Nov. 23, 1954 |